US008678090B2

(12) United States Patent
Baran, Jr. et al.

(10) Patent No.: US 8,678,090 B2
(45) Date of Patent: Mar. 25, 2014

(54) METHODS FOR TREATING HYDROCARBON-BEARING FORMATIONS WITH FLUORINATED POLYMER COMPOSITIONS

(75) Inventors: Jimmie R. Baran, Jr., Prescott, WI (US); Michael S. Terrazas, Prescott, WI (US); Rudolf J. Dams, Antwerp (BE); George G. I. Moore, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 483 days.

(21) Appl. No.: 12/809,683

(22) PCT Filed: Dec. 18, 2008

(86) PCT No.: PCT/US2008/087349
§ 371 (c)(1),
(2), (4) Date: Jun. 21, 2010

(87) PCT Pub. No.: WO2009/085904
PCT Pub. Date: Jul. 9, 2009

(65) Prior Publication Data
US 2010/0270021 A1 Oct. 28, 2010

Related U.S. Application Data

(60) Provisional application No. 61/016,129, filed on Dec. 21, 2007.

(51) Int. Cl.
*E21B 43/16* (2006.01)
(52) U.S. Cl.
USPC ........................................ 166/305.1; 166/279

(58) Field of Classification Search
USPC .............................................. 166/305.1, 279
See application file for complete search history.

(56) References Cited

U.S. PATENT DOCUMENTS

| | | | |
|---|---|---|---|
| 3,311,167 | A | 3/1967 | O'Brien |
| 3,394,758 | A | 7/1968 | Terry |
| 3,653,442 | A | 4/1972 | Ross |
| 3,902,557 | A | 9/1975 | Shaughnessy |
| 4,018,689 | A | 4/1977 | Thompson |
| 4,200,154 | A | 4/1980 | Tate |
| 4,329,236 | A | 5/1982 | Alford |

(Continued)

FOREIGN PATENT DOCUMENTS

| | | |
|---|---|---|
| CA | 2009732 | 8/1990 |
| EP | 0331307 | 9/1989 |

(Continued)

OTHER PUBLICATIONS

Adibhatla, "Effect of Surfactants on Wettability of Near-wellbore Regions of Gas Reservoirs", Journal of Petroleum Science and Engineering, 2006, vol. 52, pp. 227-236. (XP002519991).

(Continued)

*Primary Examiner* — Angela M DiTrani
*Assistant Examiner* — Silvana Runyan

(57) ABSTRACT

A method of treating a hydrocarbon-bearing formation and treated hydrocarbon-bearing formations. The method includes contacting the hydrocarbon-bearing formation with a composition having solvent and a fluorinated polymer. The fluorinated polymer has units having formula (I): A method for making a composition containing these units is also disclosed.

19 Claims, 2 Drawing Sheets

(56) References Cited

U.S. PATENT DOCUMENTS

| | | | |
|---|---|---|---|
| 4,399,077 A | 8/1983 | Vanlerberghe | |
| 4,432,882 A | 2/1984 | Raynolds | |
| 4,440,653 A | 4/1984 | Briscoe | |
| 4,460,791 A | 7/1984 | Cooke | |
| 4,533,713 A | 8/1985 | Howells | |
| 4,557,837 A | 12/1985 | Clark, III | |
| 4,563,493 A | 1/1986 | Fukui | |
| 4,565,639 A | 1/1986 | Penny | |
| 4,584,196 A | 4/1986 | Vanlerberghe | |
| 4,594,200 A | 6/1986 | Penny | |
| 4,609,477 A | 9/1986 | Crema | |
| 4,681,974 A | 7/1987 | Hisamoto | |
| 4,702,849 A | 10/1987 | Penny | |
| 4,753,740 A | 6/1988 | Marlett | |
| 4,767,545 A | 8/1988 | Karydas | |
| 4,817,715 A | 4/1989 | Peru | |
| 4,823,873 A | 4/1989 | Karydas | |
| 4,921,619 A | 5/1990 | Karydas | |
| 4,923,009 A | 5/1990 | Watkins | |
| 4,993,448 A | 2/1991 | Karydas | |
| 4,997,580 A | 3/1991 | Karydas | |
| 5,042,580 A | 8/1991 | Cullick | |
| 5,092,405 A | 3/1992 | Prukop | |
| 5,129,457 A | 7/1992 | Sydansk | |
| 5,186,257 A | 2/1993 | Stahl | |
| 5,247,993 A | 9/1993 | Sarem | |
| 5,310,002 A | 5/1994 | Blauch | |
| 5,358,052 A | 10/1994 | Gidley | |
| 5,650,483 A | 7/1997 | Malik | |
| 5,668,251 A | 9/1997 | Malik | |
| 6,165,948 A | 12/2000 | Dewenter | |
| 6,182,759 B1 | 2/2001 | Burger | |
| 6,206,102 B1 | 3/2001 | Pusch | |
| 6,225,263 B1 | 5/2001 | Collins | |
| 6,313,335 B1 | 11/2001 | Roberts | |
| 6,365,769 B1 | 4/2002 | Behr | |
| 6,485,789 B1 | 11/2002 | Allewaert | |
| 6,579,572 B2 | 6/2003 | Espin | |
| 6,660,693 B2 | 12/2003 | Miller | |
| 6,664,354 B2 * | 12/2003 | Savu et al. | 526/243 |
| 6,689,854 B2 * | 2/2004 | Fan et al. | 526/243 |
| 6,729,409 B1 | 5/2004 | Gupta | |
| 6,911,417 B2 | 6/2005 | Chan | |
| 6,945,327 B2 | 9/2005 | Ely | |
| 6,972,274 B1 | 12/2005 | Slikta et al. | |
| 7,084,094 B2 | 8/2006 | Gunn et al. | |
| 7,087,710 B2 * | 8/2006 | Medsker et al. | 528/402 |
| 7,165,613 B2 | 1/2007 | Chan et al. | |
| 7,417,099 B2 | 8/2008 | Savu et al. | |
| 7,585,817 B2 | 9/2009 | Pope | |
| 7,629,298 B2 | 12/2009 | Arco et al. | |
| 7,772,162 B2 | 8/2010 | Pope et al. | |
| 7,855,169 B2 | 12/2010 | Pope et al. | |
| 8,043,998 B2 | 10/2011 | Pope et al. | |
| 8,138,127 B2 | 3/2012 | Pope et al. | |
| 8,176,981 B2 | 5/2012 | Savu | |
| 8,236,737 B2 | 8/2012 | Fan | |
| 8,261,825 B2 | 9/2012 | Pope et al. | |
| 2003/0092581 A1 | 5/2003 | Crews | |
| 2003/0139549 A1 | 7/2003 | Savu | |
| 2005/0244641 A1 | 11/2005 | Vincent | |
| 2006/0045979 A1 | 3/2006 | Dams | |
| 2006/0264334 A1 | 11/2006 | Gupta | |
| 2007/0015669 A1 | 1/2007 | Zhang | |
| 2007/0029085 A1 | 2/2007 | Panga | |
| 2007/0049646 A1 | 3/2007 | Moore | |
| 2007/0123430 A1 | 5/2007 | Pasquier | |
| 2007/0225176 A1 * | 9/2007 | Pope et al. | 507/221 |
| 2010/0152071 A1 | 6/2010 | Pope | |
| 2010/0181068 A1 | 7/2010 | Pope | |
| 2010/0224361 A1 * | 9/2010 | Pope et al. | 166/250.02 |
| 2010/0270019 A1 | 10/2010 | Pope | |
| 2010/0270020 A1 | 10/2010 | Baran, Jr. | |
| 2010/0276142 A1 | 11/2010 | Skildum | |
| 2010/0276149 A1 | 11/2010 | Pope | |
| 2010/0288498 A1 | 11/2010 | Moore | |
| 2011/0056689 A1 | 3/2011 | Baran, Jr. | |
| 2011/0124532 A1 | 5/2011 | Maurer | |
| 2011/0136704 A1 | 6/2011 | Sharma | |
| 2011/0177983 A1 | 7/2011 | Baran, Jr. | |
| 2011/0201531 A1 | 8/2011 | Sharma | |
| 2011/0247822 A1 | 10/2011 | Dams | |
| 2011/0247823 A1 | 10/2011 | Dams | |
| 2012/0097393 A1 | 4/2012 | Dams | |

FOREIGN PATENT DOCUMENTS

| | | |
|---|---|---|
| GB | 2031482 | 4/1980 |
| RU | 1706204 | 11/1994 |
| WO | WO 98/51726 | 11/1998 |
| WO | WO 03/018508 | 3/2003 |
| WO | WO 03/089540 | 10/2003 |
| WO | WO 2005/028589 A1 | 3/2005 |
| WO | WO 2005/035936 A1 | 4/2005 |
| WO | WO 2006/065752 | 6/2006 |
| WO | WO 2007/017806 | 2/2007 |
| WO | WO 2007/033489 | 3/2007 |
| WO | WO 2007/097975 | 8/2007 |
| WO | WO 2008/070704 | 6/2008 |

OTHER PUBLICATIONS

Al-Anazi et al., "A Successful Methanol Treatment in a Gas-Condensate Reservoir: Field Application", Mar. 2003, SPE 80901, Society of Petroleum Engineers Inc., pp. 1-9.

Clark, H. B., et al., "Use of Fluorochemical Surfactants in Nonaqueous Stimulation Fields," *Journal of Petroleum Chemistry* vol. 32, No. 10 (1980) p. 1695-1697.

Crema et al., "Foaming of Anhydrous Methanol for Well Stimulation", Apr. 1985, SPE 13565, Society of Petroleum Engineers Inc., 4 pages.

Fahes, "Wettability Alteration to Intermediate Gas-Wetting in Gas-Condensate Reservoirs at High Temperatures", Oct. 9-12, 2005, SPE Annual Technical Conference and Exhibition, Dallas, TX, pp. 1-14. SPE 96184.

Kumar, "Improving the Gas and Condensate Relative Permeability Using Chemical Treatments", May 15-17, 2006, SPE Gas Technology Symposium, Calgary, Alberta, pp. 1-9. SPE 100529.

Li, K. et al., "Experimental Study of Wettability Alteration to Preferential Gas-Wetting in Porous Media and Its Effects", SPE Reservoir Eval. and Eng 3 (2), pp. 139-149.

McLeod, "The Use of Alcohol in Gas Well Stimulation", Nov. 10-11, 1966, SPE Eastern Regional Meeting, Columbus, Ohio, pp. 1-13. SPE 1663.

Noh et al., "Experimental Study of Wettability Alteration for Reservoir Rock", Project 3—Gas Condensate Reservoirs Part 2, Reservoir Engineering Research Institute, Apr. 1-Jun. 30, 2Q.05.

Noh et al., "Effect of Wettability on High-Velocity Coefficient in Two-Phase Gas-Liquid Flow", SPE 102773, 2006 SPE Annual Technical Conference and Exhibition held in San Antonio, TX, Sep. 24-27, 2006.

Panga, "Preventive Treatment for Enhancing Water Removal from Gas Reservoirs by Wettability Alteration", Mar. 11-14, 2007, 15th SPE Middle East Oil & Gas Show and Conference, Kingdom of Bahrain, pp. 1-12. SPE 105367.

Tang, "Relative Permeability Modification in Gas/Liquid Systems Through Wettability Alteration to Intermediate Gas Wetting", SPE Reservoir Evaluation and Engineering, Dec. 2002, vol. 5, No. 6, pp. 427-436. SPE 81195.

International Search Report for PCT/US2008/087349, 4 pgs.

Written Opinion of the ISA for International Application No. PCT/US2008/087349, 9 pgs.

Product Data Sheet entitled: "PolyFox™ the Friendly Fluorosurfactant: PolyFox™ PF-159 Nonionic Fiuorosurfactant for Aqueous, Solvent or 100% Solids Coatings and Cleaners", Jan. 23, 2007, OMNOVA Solutions Inc,, 2 pp.

(56) References Cited

OTHER PUBLICATIONS

Product Data Sheet entitled: "PolyFox™ the Friendly Fluorosurfactant: PolyFox Grade Slate", Jan. 23, 2007, OMNOVA Solutions inc., 2 pp.

Product Data Sheet entitled: "PolyFox™ the Friendly Fluorosurfactant; Fluorosurfactants for Improved Flow, Leveling and Surface Appearance in Aqueous Coatings", Jan. 23, 2007, OMNOVA Solutions Inc., 4 pp.

Presentation entitled: "PolyFox™ the Friendly Fluorosurfactant"; Presented to Sepawa Benelux Nov. 16, 2004, 29 pp.

Letter from David G. Burleson, Zoilinger & Burleson Ltd. Intellectual Property Law, 6 pages, dated Nov. 23, 2013.

* cited by examiner

METHODS FOR TREATING HYDROCARBON-BEARING FORMATIONS WITH FLUORINATED POLYMER COMPOSITIONS

CROSS REFERENCE TO RELATED APPLICATIONS

This application is a national stage filing under 35 U.S.C. 371 of PCT/US2008/087349, filed Dec. 18, 2008, which claims priority to U.S. Provisional Application No. 61/016,129, filed Dec. 21, 2007, the disclosure of which is incorporated by reference in its entirety herein.

BACKGROUND

In the oil and gas industry, certain surfactants (including certain fluorinated surfactants) have been used, for example, as fluid additives for various downhole operations (e.g., fracturing, waterflooding, and drilling). Often, these surfactants function to decrease the surface tension of the fluid or to stabilize foamed fluids.

Some hydrocarbon and fluorochemical compounds have been used to modify the wettability of reservoir rock, which may be useful, for example, to prevent or remedy water blocking (e.g., in oil or gas wells) or liquid hydrocarbon accumulation (e.g., in gas wells) in the vicinity of the well bore (i.e., the near well bore region). Water blocking and liquid hydrocarbon accumulation may result from natural phenomena (e.g., water-bearing geological zones or condensate banking) and/or operations conducted on the well (e.g., using aqueous or hydrocarbon fluids). Water blocking and condensate banking in the near well bore region of a hydrocarbon-bearing geological formation can inhibit or stop production of hydrocarbons from the well and hence are typically not desirable. Not all hydrocarbon and fluorochemical compounds, however, provide the desired wettability modification, and under some downhole conditions.

Solvent injection (e.g., injection of methanol) has been used to alleviate the problems of water blocking and condensate banking in gas wells, but this method may provide only a temporary benefit and may not be desirable under some downhole conditions.

SUMMARY

In one aspect, the present disclosure provides a method of treating a hydrocarbon-bearing formation, the method comprising contacting the hydrocarbon-bearing formation with a composition comprising solvent and a fluorinated polymer, wherein the fluorinated polymer comprises units having formula:

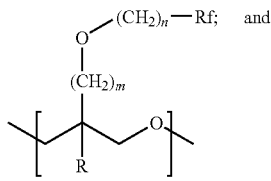

at least one hydrophilic group,
wherein
each Rf independently represents a fluoroalkyl group having from 1 to 4 carbon atoms;
each R is independently hydrogen, alkyl having 1 to 6 carbon atoms, or —(CH$_2$)$_m$—O—(CH$_2$)$_n$—Rf;
each m is independently 1, 2, or 3; and
each n is independently 0, 1, 2, or 3.

In some embodiments, the hydrocarbon-bearing formation is at least one of a siliciclastic formation or fractured formation comprising a plurality of proppants in a fracture.

In some embodiments of the foregoing method, the hydrocarbon-bearing formation is penetrated by a wellbore, wherein a region near the wellbore is contacted with the composition. In some of these embodiments, the method further comprises obtaining hydrocarbons from the wellbore after contacting the hydrocarbon-bearing formation with the composition.

In another aspect, the present disclosure provides a hydrocarbon-bearing formation treated according to the method described herein.

In another aspect, the present disclosure provides a method of making a composition, the method comprising:

selecting a geological zone of a hydrocarbon-bearing formation, the geological zone having a temperature, a hydrocarbon composition, and a brine composition;

receiving data comprising the temperature and at least one of the hydrocarbon composition or the brine composition of the geological zone of the formation;

generating a formulation comprising a fluorinated polymer and solvent, wherein the fluorinated polymer comprises units having formula:

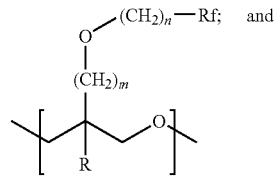

at least one hydrophilic group,
wherein
each Rf independently represents a fluoroalkyl group having from 1 to 4 carbon atoms;
each R is independently hydrogen, alkyl having 1 to 6 carbon atoms, or —(CH$_2$)$_m$—O—(CH$_2$)$_n$—Rf;
each m is independently 1, 2, or 3; and
each n is independently 0, 1, 2, or 3,
wherein the formulation is generated based at least in part on compatibility information concerning the fluorinated polymer, the solvent, the temperature, and at least one of the hydrocarbon composition or the brine composition of the geological zone of the formation; and
making the composition according to the formulation.

The methods of treating a hydrocarbon-bearing formation described herein may be used to increase the permeability in hydrocarbon-bearing formations wherein two phases (i.e., a gas phase and an oil phase) of the hydrocarbons are present, (e.g., in gas wells having retrograde condensate and oil wells having black oil or volatile oil). These methods are also typically useful for increasing the permeability in hydrocarbon-bearing formations having brine. In some embodiments, at least one of gas, condensate, oil, or water permeability is increased in the hydrocarbon-bearing formation after the treatment. Treatment of a near wellbore region of an oil and/or gas well that has at least one of brine or two phases of hydrocarbons in the near wellbore region may increase the productivity of the well. The term "productivity" as applied to a well refers to the capacity of a well to produce hydrocarbons (i.e., the ratio of the hydrocarbon flow rate to the pressure drop, where the pressure drop is the difference between the average reservoir pressure and the flowing bottom hole well pressure (i.e., flow per unit of driving force)). Although not wishing to be bound by theory, it is believed that the fluorinated polymers generally adsorb to the hydrocarbon-bearing formations (e.g., siliciclastic formations) under downhole conditions and modify the wetting properties of the rock in the formation to facilitate the removal of hydrocarbons and/or brine. The fluorinated polymer may remain on the rock for the duration of an extraction of hydrocarbons from the formation (e.g., 1 week, 2 weeks, 1 month, or longer).

In this application:

Terms such as "a", "an" and "the" are not intended to refer to only a singular entity, but include the general class of which a specific example may be used for illustration. The terms "a", "an", and "the" are used interchangeably with the term "at least one".

The term "comprises at least one of" followed by a list refers to comprising any one of the items in the list and any combination of two or more items in the list.

The term "brine" refers to water having at least one dissolved electrolyte salt therein (e.g., (e.g., sodium chloride, calcium chloride, strontium chloride, magnesium chloride, potassium chloride, ferric chloride, ferrous chloride, and hydrates thereof) at any nonzero concentration (in some embodiments, less than 1000 parts per million by weight (ppm), or greater than 1000 ppm, greater than 10,000 ppm, greater than 20,000 ppm, 30,000 ppm, 40,000 ppm, 50,000 ppm, 100,000 ppm, 150,000 ppm, or even greater than 200,000 ppm).

The term "hydrocarbon-bearing formation" includes both hydrocarbon-bearing formations in the field (i.e., subterranean hydrocarbon-bearing formations) and portions of such hydrocarbon-bearing formations (e.g., core samples).

"Alkyl group" and the prefix "alk-" are inclusive of both straight chain and branched chain groups and of cyclic groups. Unless otherwise specified, alkyl groups herein have up to 20 carbon atoms. Cyclic groups can be monocyclic or polycyclic and, in some embodiments, have from 3 to 10 ring carbon atoms.

The term "polymer" refers to a molecule of molecular weight of at least 1000 grams per mole, the structure of which essentially includes the multiple repetition of units derived, actually or conceptually, from molecules of low relative molecular mass.

The term "fluoroalkyl group" includes linear, branched, and/or cyclic alkyl groups in which all C—H bonds are replaced by C—F bonds as well as groups in which hydrogen or chlorine atoms are present instead of fluorine atoms provided that up to one atom of either hydrogen or chlorine is present for every two carbon atoms. In some embodiments of fluoroalkyl groups, when at least one hydrogen or chlorine is present, the fluoroalkyl group includes at least one trifluoromethyl group.

All numerical ranges are inclusive of their endpoints unless otherwise stated.

BRIEF DESCRIPTION OF THE DRAWINGS

For a more complete understanding of the features and advantages of the present disclosure, reference is now made to the detailed description along with the accompanying figures and in which.

DETAILED DESCRIPTION

Figure 1:
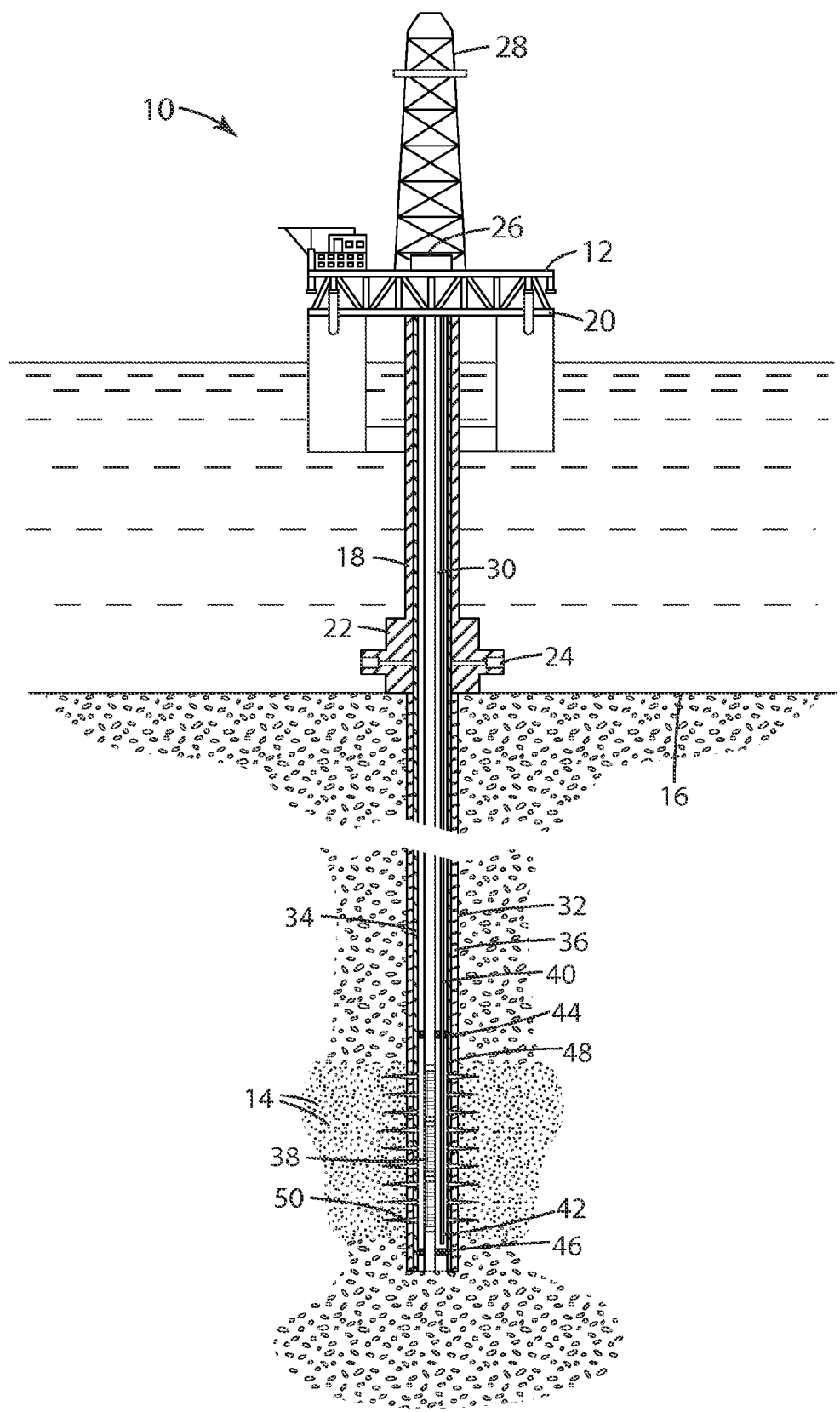
FIG. 1 is a schematic illustration of an exemplary embodiment of an offshore oil platform operating an apparatus for progressively treating a near wellbore region according to the present disclosure.

Methods according to the present disclosure include a fluorinated polymer comprising (e.g., at least 2, 3, 4, 5, 6, 7, 8, 9, or even at least 10 up to 15, 20, 25, 30, 35, 40, 45, 50 or even up to 100) units having formula:

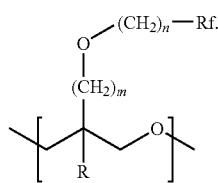

In this formula, Rf represents a fluorinated alkyl group having from 1 to 4 (in some embodiments, 1 to 3 or even 1 to 2) carbon atoms. R is hydrogen, alkyl having 1 to 6 carbon atoms, or —$(CH_2)_m$—O—$(CH_2)_n$—Rf. In some embodiments, R is hydrogen or alkyl having from 1 to 6 carbon atoms. In some embodiments, each R is independently hydrogen, methyl, or ethyl. In some embodiments, R is methyl. Each m is independently 1, 2, or 3, and each n is independently 0, 1, 2, or 3. In some embodiments, each n is independently 1 or 2. In some embodiments, m and n are each 1.

In addition to fluorinated units, the fluorinated polymers useful for practicing the methods described herein have at least one (e.g., 1, 2, 3, 4, 5 or more) hydrophilic group (e.g., a polar group). The fluorinated polymers useful for practicing the methods disclosed herein may be nonionic, anionic, cationic, or amphoteric (e.g., zwitterionic). It is within the scope of this disclosure to use mixtures of fluorinated polymers.

In some embodiments, the fluorinated polymer comprises a plurality of (i.e., multiple) alkyleneoxy groups having from 2 to 4 carbon atoms, which may be present in a block of repeating ethylene oxide units. In some of these embodiments, at least a portion of the plurality of alkyleneoxy groups having from 2 to 4 carbon atoms are present in segments represented by formula:

or

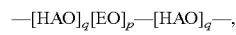

wherein

EO represents —$CH_2CH_2O$—;

each HAO independently represents —$CH(CH_3)CH_2O$—, —$CH_2CH(CH_3)O$—, —$CH(CH_2CH_3)CH_2O$—, —$CH_2CH(CH_2CH_3)O$—, or —$CH_2C(CH_3)_2O$—;

each p is independently an integer of from 1 to about 250 (in some embodiments, 1 to 150, 1 to 100, or 1 to 50); and each q is independently an integer of from 0 to about 55. In some embodiments, each HAO independently represents —$CH(CH_3)CH_2O$— or —$CH_2CH(CH_3)O$—. In some embodiments, q is in a range of from 1 to 55 (e.g., 1 to 30, 1 to 20, or 1 to 15) and the ratio p/q has a value of from at least 0.5, 0.75, 1 or 1.5 to 2.5, 2.7, 3, 4, 5, or more. In some embodiments wherein the fluorinated polymer comprises a plurality of alkyleneoxy groups having from 2 to 4 carbon atoms, the fluorinated polymer is a nonionic polymer. Fluorinated polymers comprising a plurality of alkyleneoxy groups may also contain at least one anionic group, cationic group, or amphoteric group.

In some embodiments, the fluorinated polymer is represented by formula:

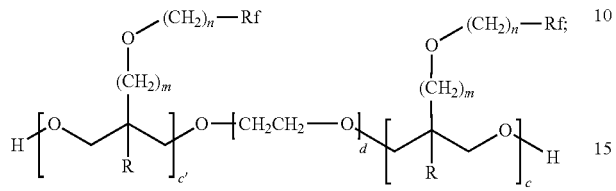

wherein c and c' each independently have a value from 0 to 5, with the proviso that c+c' is at least 2, 3, 4, 5 6, 7, 8, 9, or even at least 10; and d is an integer from about 5 to about 50 (e.g., in a range from 5 to 10, 5 to 20, 5 to 25, 5 to 30, 5 to 40, 10 to 50, 10 to 40, 10 to 30, or 10 to 25). Some fluorinated polymers of this formula are commercially available, for example, from Omnova Solutions Inc., Fairlawn, Ohio, under the trade designations "POLYFOX PF-151N" and "POLYFOX PF-159".

In some embodiments, the fluorinated polymer is an anionic polymer having at least 1, 2, 3, 4 or even 5 anionic groups. Typical anionic groups include carboxylates, sulfates, sulfonates, phosphates, and phosphonates. In some embodiments, the fluorinated polymer comprises at least one of —P(O)(OY)$_2$, —O—P(O)(OY)$_2$, (—O)$_2$—P(O)(OY), —SO$_3$Y, —O—SO$_3$Y, and —CO$_2$Y, wherein Y is hydrogen or a counter cation. In some embodiments, the anionic group is —O—P(O)(OY)$_2$ or —O—SO$_3$Y. In some embodiments, Y is hydrogen. In some embodiments, Y is a counter cation. Exemplary Y counter cations include alkali metal ions (e.g., sodium, potassium, and lithium), alkaline earth metal ions (e.g., calcium and magnesium), ammonium, alkyl ammonium (e.g., dialkylammonium, trialkylammonium, and tetraalkylammonium wherein alkyl is optionally substituted by hydroxyl, fluoride, or aryl), and five to seven membered heterocyclic groups having a positively charged nitrogen atom (e.g, a pyrrolium ion, pyrazolium ion, pyrrolidinium ion, imidazolium ion, triazolium ion, isoxazolium ion, oxazolium ion, thiazolium ion, isothiazolium ion, oxadiazolium ion, oxatriazolium ion, dioxazolium ion, oxathiazolium ion, pyridinium ion, pyridazinium ion, pyrimidinium ion, pyrazinium ion, piperazinium ion, triazinium ion, oxazinium ion, piperidinium ion, oxathiazinium ion, oxadiazinium ion, and morpholinium ion). In some embodiments, Y is an alkali metal ion (e.g., sodium, potassium, and lithium). In some embodiments, Y is ammonium. In some embodiments, the counter ion is fluorinated.

In some embodiments, the fluorinated polymer is represented by formula:

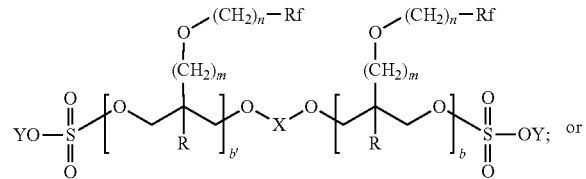

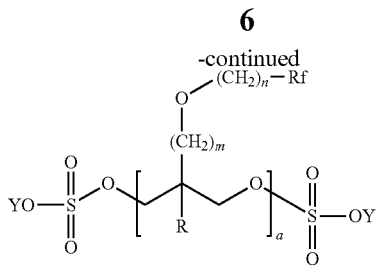

wherein a has a value from 2 to about 10 (e.g., 3, 4, 5, 6, 7, 8, 9, or 10);

b and b' each independently have a value from 0 to 5, with the proviso that b+b' is at least 2, 3, 4, 5, 6, 7, 8, 9, or even at least 10;

X is alkylene that is optionally interrupted by —O— or —S—; and

Y is hydrogen or a counter cation (as defined above, e.g., ammonium or an alkali metal cation). In some embodiments, X is ethoxyethylene, ethylene, propylene, butylene, or pentylene. In some embodiments, X is pentylene (e.g., neopentylene). Some fluorinated polymers of this formula are commercially available, for example, from Omnova Solutions Inc., under the trade designations "POLYFOX PF-156A" and "POLYFOX PF-136A".

In some embodiments, the fluorinated polymer is a cationic polymer having at least 1, 2, 3, 4, or even 5 cationic groups. Typical cationic groups include quaternary ammonium and phosphonium groups. The ammonium and phosphonium groups may be substituted by up to three alkyl groups (e.g., alkylammonium, dialkylammonium, and trialkylammonium, wherein alkyl is optionally substituted by hydroxyl, fluoride, or aryl). Typical anionic counterions in cationic polymers include halides (i.e., fluoride, chloride, bromide, and iodide), organic acid salts (e.g., acetate and citrate), organic sulfonic acid salts (e.g., alkylsulfates), nitrate, and tetrafluoroborate. The organic acid salts and sulfonic acid salts may be partially fluorinated or perfluorinated. Counter ions for cationic surfactants can also include anionic surfactants (e.g., fluorinated anionic surfactants).

In some embodiments, the fluorinated polymer is an amine-oxide polymer (e.g., neutralized with an anionic surfactant such as a fluorinated anionic surfactant).

Fluorinated polymers comprising units having formula:

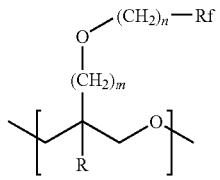

can be prepared by ring-opening reactions of oxetane rings having pendant fluorinated groups. Useful precursors to these fluorine-substituted oxetane starting materials include 3-bromomethyl-3-methyloxetane, 3,3-bis(chloromethyl)oxetane, 3,3-bis(bromomethyl)oxetane, and 3,3-bis-(hydroxymethyl)oxetane di-para-toluenesulfonate, which are commercially available or can be prepared by known methods; (see, e.g., U.S. Pat. No. 5,650,483 (Malik et al.). To prepare oxetanes with fluorine substitution, these halogen- or sulfonate-substituted oxetanes can be reacted with fluorinated alcohols (e.g., trifluoroethanol, heptafluorobutanol, nonafluorohexanol) in the presence of a base (e.g, sodium hydride, potassium hydride, potassium t-butoxide, calcium hydride, sodium hydroxide, and potassium hydroxide), in a suitable solvent (e.g., a polar aprotic solvent such as dimethylformamide, dimethylacetamide, and dimethylsulfoxide). The reaction may be run at an elevated temperature (e.g., 60° C. to 90° C.) up to the reflux temperature of the solvent.

Fluorinated oxetane rings typically undergo ring-opening polymerization in the presence of Lewis Acid catalysts such as complexes of boron trifluoride (e.g., boron trifluoride etherate, boron trifluoride tetrahydropyran, and boron trifluoride tetrahydrofuran), phosphorous pentafluoride, antimony pentafluoride, zinc chloride, and aluminum bromide. The reaction is typically run in the presence of a compound having at least one hydroxyl group such as a fluorinated alcohol (e.g., trifluoroethanol, heptafluorobutanol, and nonafluorohexanol), a diol (e.g., ethylene glycol, 1,4-butanediol, propylene glycol, 1,5-pentanediol, and neopentyl glycol), a multi-functional alcohol (e.g., pentaerythritol and trimethylolpropane), a monohydroxy alcohol (e.g., methanol, ethanol, and n-propanol), or a combination thereof. In some embodiments, the compound having at least one hydroxyl group comprises a plurality of alkyleneoxy groups having from 2 to 4 carbon atoms (e.g., having formula —$CH_2$—$CH_2$—O—). Compounds of this type include poly(ethylene glycols) of various molecular weights (e.g., number average molecular weights of at least 200, 300, or even 500 grams per mole up to 1000, 2000, 4000, 5000, 8000, 10000, or even 15000 grams per mole). Poly(ethylene glycols) are available, for example, from a variety of commercial sources (e.g., from Sigma-Aldrich, St. Louis, Mo. and from Dow Chemical, Midland, Mich., under the trade designation "CARBOWAX"). Compound having at least one hydroxyl group and plurality of alkyleneoxy groups having from 2 to 4 carbon atoms (e.g., having formula —$CH_2$—$CH_2$—O—) also include block copolymers of ethylene oxide and propylene oxide having a molecular weight of about 500 to 15000 grams per mole (e.g., those available from BASF Corporation, Ludwigshafen, Germany, under the trade designation "PLURONIC").

The ring-opening polymerization of fluorinated oxetane rings can also be carried out in the presence of diamines. Useful diamines include polyetheramines available from Huntsman Corporation, The Woodlands, Tex., under the trade designation "JEFFAMINE".

It may be useful in some cases to include another monomer in the ring-opening polymerization of substituted oxetanes. For example, oxiranes (e.g., ethylene oxide, propylene oxide, perfluorooctyl propylene oxide), tetrahydrofuran, tetrahydropyran, 2-methyltetrahydrofuran, 1,4-dioxane, 1,3-dioxane, 1,3-dioxalane, and trioxane can be used as co-monomers in the polymerization reaction. Caprolactone may also be used as a co-monomer in the polymerization reaction; however, in some embodiments, the fluorinated polymer is free of carboxylate ester groups.

Ring-opening polymerizations are typically carried out in a suitable solvent such as a hydrocarbon solvent or a halogenated solvent (e.g., dichloromethane, carbon tetrachloride, trichloroethylene, or dichloroethane). The reactions can be carried out at or near room temperature or below (e.g., in a range from about 0° C. to 40° C.).

Polymers made by ring-opening polymerizations of oxetanes and optionally other monomers often contain a hydroxyl end group, which can be converted, for example, to a anionic end group to prepare anionic fluorinated polymers or to a cationic end group to prepare a cationic fluorinated polymer. For example, sulfuric acid can be added to a hydroxyl-terminated polymer to prepare an anionic polymer having sulfate end groups. The counter ion can then be exchanged using conventional methods. The acid (e.g., sulfuric acid) can be added to the polymer at a temperature in a range from about −20° C. to 50° C. (or −5° C. to 15° C.) in a suitable solvent (e.g., tetrahydrofuran). Neutralization with a base (e.g., aqueous ammonium hydroxide) can be carried out at a temperature in a range from about 0° C. to 60° C., or about 15° C. to 40° C. In another example, terminal hydroxyl groups can be converted to leaving groups (e.g., alkanesulfonate esters or arenesulfonate esters), which can then be treated with nucleophilic tertiary amines to provide a cationic polymer have alkylammonium end groups. Such sulfonate esters can be prepared, for example, by treating the terminal hydroxyl groups with a sulfonic anhydride (e.g., trifluoromethane sulfonic anhydride) or a sulfonyl halide (e.g., para-toluene sulfonyl chloride), typically in the presence of triethylamine in a suitable organic solvent at a temperature below room temperature (e.g., about −40° C. to about 0° C.). A tertiary amine (e.g., trimethylamine, triethylamine, N-methylpiperazine, N-methylpyrrolidine, or 1,4-diazabicyclo(2.2.2)octane) can then be used to displace the sulfonate and provide the cationic polymer.

The hydroxyl end groups (e.g., in difunctional polymers) of polymerized oxetanes may also be treated with difunctional carboxylic acids (e.g., adipic acid) or with isocyanates to provide other useful polymers. Further details or methods of making fluorinated polymers containing units having formula:

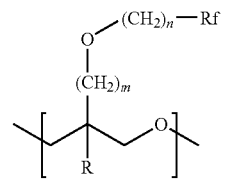

can be found, for example, in U.S. Pat. No. 7,087,701 (Medsker et al.).

In some embodiments, fluorinated polymers useful in practicing the treatment methods and methods of making a composition disclosed herein are free of silane groups (i.e., a group having at least one Si—O—Z moiety, wherein Z is H or substituted or unsubstituted alkyl or aryl). In some embodiments, the fluorinated polymer is free of carboxylate ester groups. The absence of silane groups and carboxylate ester groups may be advantageous, for example, because silane groups may undergo hydrolysis and form polysiloxanes in the presence of some brines and at some temperatures when delivering the fluorinated polymer to a geological zone.

Compositions useful in practicing the treatment methods disclosed herein comprise solvent. Examples of useful solvents for any of these methods include organic solvents, water, easily gasified fluids (e.g., ammonia, low molecular weight hydrocarbons, and supercritical or liquid carbon dioxide), and combinations thereof. In some embodiments, the compositions are essentially free of water (i.e., contains less than 0.1 percent by weight of water, based on the total weight of the composition). In some embodiments, the solvent is a water-miscible solvent (i.e., the solvent is soluble in water in all proportions). Examples of organic solvents include polar and/or water-miscible solvents, for example, monohydroxy alcohols having from 1 to 4 or more carbon atoms (e.g., methanol, ethanol, isopropanol, propanol, or butanol); polyols such as glycols (e.g., ethylene glycol or propylene glycol), terminal alkanediols (e.g., 1,3-propanediol, 1,4-butanediol, 1,6-hexanediol, or 1,8-octanediol), polyglycols (e.g., diethylene glycol, triethylene glycol, dipropylene glycol, or poly(propylene glycol)), triols (e.g., glycerol, trimethylolpropane), or pentaerythritol; ethers such as diethyl ether, methyl t-butyl ether, tetrahydrofuran, p-dioxane, or polyol ethers (e.g., glycol ethers (e.g., ethylene glycol monobutyl ether, diethylene glycol monomethyl ether, dipropylene glycol monomethyl ether, propylene glycol monomethyl ether, 2-butoxyethanol, or those glycol ethers available under the trade designation "DOWANOL" from Dow Chemical Co., Midland, Mich.)); ketones (e.g., acetone or 2-butanone); and combinations thereof.

In some embodiments of the treatment methods and the methods of making a composition disclosed herein, the solvent comprises at least one of a polyol or polyol ether independently having from 2 to 25 (in some embodiments, 2 to 15, 2 to 10, 2 to 9, or even 2 to 8) carbon atoms. In some embodiments, the solvent comprises a polyol. The term "polyol" refers to an organic molecule consisting of C, H, and O atoms connected one to another by C—H, C—C, C—O, O—H single bonds, and having at least two C—O—H groups. In some embodiments, useful polyols have 2 to 25, 2 to 20, 2 to 15, 2 to 10, 2 to 8, or even 2 to 6 carbon atoms. In some embodiments, the solvent comprises a polyol ether. The term "polyol ether" refers to an organic molecule consisting of C, H, and O atoms connected one to another by C—H, C—C, C—O, O—H single bonds, and which is at least theoretically derivable by at least partial etherification of a polyol. In some embodiments, the polyol ether has at least one C—O—H group and at least one C—O—C linkage. Useful polyol ethers may have from 3 to 25 carbon atoms, 3 to 20, 3 to 15, 3 to 10, 3 to 9, 3 to 8, or even from 5 to 8 carbon atoms. In some embodiments, the polyol is at least one of ethylene glycol, propylene glycol, poly(propylene glycol), 1,3-propanediol, or 1,8-octanediol, and the polyol ether is at least one of 2-butoxyethanol, diethylene glycol monomethyl ether, ethylene glycol monobutyl ether, dipropylene glycol monomethyl ether, or 1-methoxy-2-propanol. In some embodiments, the polyol and/or polyol ether has a normal boiling point of less than 450° F. (232° C.), which may be useful, for example, to facilitate removal of the polyol and/or polyol ether from a well after treatment.

In some embodiments, useful solvents for practicing the treatment methods or the methods of making a composition disclosed herein comprise at least one of water, a monohydroxy alcohol, an ether, or a ketone, wherein the monohydroxy alcohol, the ether, and the ketone each independently have up to 4 carbon atoms. Exemplary monohydroxy alcohols having from 1 to 4 carbon atoms include methanol, ethanol, n-propanol, isopropanol, 1-butanol, 2-butanol, isobutanol, and t-butanol. Exemplary ethers having from 2 to 4 carbon atoms include diethyl ether, ethylene glycol methyl ether, tetrahydrofuran, p-dioxane, and ethylene glycol dimethyl ether. Exemplary ketones having from 3 to 4 carbon atoms include acetone, 1-methoxy-2-propanone, and 2-butanone. In some embodiments, useful solvents for practicing the methods disclosed herein comprise at least one of methanol, ethanol, isopropanol, tetrahydrofuran, or acetone.

In some embodiments of the treatment methods and the methods of making a composition disclosed herein, the compositions comprise at least two organic solvents. In some embodiments, the solvent comprises at least one of a polyol or polyol ether independently having from 2 to 25 (in some embodiments, 2 to 15, 2 to 10, 2 to 9, or even 2 to 8) carbon atoms and at least one of water, a monohydroxy alcohol, an ether, or a ketone, wherein the monohydroxy alcohol, the ether, and the ketone each independently have up to 4 carbon atoms. In these embodiments, in the event that a component of the solvent is a member of two functional classes, it may be used as either class but not both. For example, ethylene glycol methyl ether may be a polyol ether or a monohydroxy alcohol, but not as both simultaneously. In these embodiments, each solvent component may be present as a single component or a mixture of components. In some embodiments, compositions useful for practicing any of the methods disclosed herein comprise at least one of a polyol or polyol ether independently having from 2 to 25 (in some embodiments, 2 to 15, 2 to 10, 2 to 9, or even 2 to 8) carbon atoms and at least one monohydroxy alcohol having up to 4 carbon atoms. In some embodiments, the solvent consists essentially of (i.e., does not contain any components that materially affect water solubilizing or displacement properties of the composition under downhole conditions) at least one of a polyol having from 2 to 25 (in some embodiments, 2 to 20, 2 to 15, 2 to 10, 2 to 9, 2 to 8, or even 2 to 6) carbon atoms or polyol ether having from 3 to 25 (in some embodiments, 3 to 20, 3 to 15, 3 to 10, 3 to 9, 3 to 8, or even from 5 to 8) carbon atoms, and at least one monohydroxy alcohol having from 1 to 4 carbon atoms, ether having from 2 to 4 carbon atoms, or ketone having from 3 to 4 carbon atoms. Typically, the solvents described herein are capable of solubilizing more brine in the presence of fluorinated polymers than methanol alone.

For any of the embodiments wherein the compositions useful for practicing the methods disclosed herein comprise at least one of a polyol or polyol ether independently having from 2 to 25 (in some embodiments, 2 to 15, 2 to 10, 2 to 9, or even 2 to 8) carbon atoms, the polyol or polyol ether is present in the composition at least 50, 55, 60, or 65 percent by weight and up to 75, 80, 85, or 90 percent by weight, based on the total weight of the composition. In some embodiments, the solvent comprises up to 50, 40, 30, 20, or even 10 percent by weight of a monohydroxy alcohol having up to 4 carbon atoms, based on the total weight of the composition.

Useful combinations of two solvents include 1,3-propanediol (80%)/isopropanol (IPA) (20%), propylene glycol (70%)/IPA (30%), propylene glycol (90%)/IPA (10%), propylene glycol (80%)/IPA (20%), ethylene glycol (50%)/ethanol (50%), ethylene glycol (70%)/ethanol (30%), propylene glycol monobutyl ether (PGBE) (50%)/ethanol (50%), PGBE (70%)/ethanol (30%), dipropylene glycol monomethyl ether (DPGME) (50%)/ethanol (50%), DPGME (70%)/ethanol (30%), diethylene glycol monomethyl ether (DEGME) (70%)/ethanol (30%), triethylene glycol monomethyl ether (TEGME) (50%)/ethanol (50%), TEGME (70%)/ethanol (30%), 1,8-octanediol (50%)/ethanol (50%), propylene glycol (70%)/tetrahydrofuran (THF) (30%), propylene glycol (70%)/acetone (30%), propylene glycol (70%), methanol (30%), propylene glycol (60%)/IPA (40%), 2-butoxyethanol (80%)/ethanol (20%), 2-butoxyethanol (70%)/ethanol (30%), 2-butoxyethanol (60%)/ethanol (40%), propylene glycol (70%)/ethanol (30%), ethylene glycol (70%)/IPA (30%), and glycerol (70%)/IPA (30%), wherein the exemplary percentages are by weight are based on the total weight of solvent.

The amount of solvent typically varies inversely with the amount of other components in compositions useful in practicing any of the methods disclosed herein. For example, based on the total weight of the composition the solvent may be present in the composition in an amount of from at least 10, 20, 30, 40, or 50 percent by weight or more up to 60, 70, 80, 90, 95, 98, or even 99 percent by weight, or more.

Typically, in compositions useful for practicing any of the methods described herein, the fluorinated polymer is present in the composition at least 0.01, 0.015, 0.02, 0.025, 0.03, 0.035, 0.04, 0.045, 0.05, 0.055, 0.06, 0.065, 0.07, 0.075, 0.08, 0.085, 0.09, 0.095, 0.1, 0.15, 0.2, 0.25, 0.5, 1, 1.5, 2, 3, 4, or 5 percent by weight, up to 5, 6, 7, 8, 9, or percent by weight, based on the total weight of the composition. For example, the amount of the fluorinated polymer in the compositions may be in a range of from 0.01 to 10, 0.1 to 10, 0.1 to 5, 1 to 10, or even in a range from 1 to 5 percent by weight, based on the total weight of the composition. Lower and higher amounts of the fluorinated polymer in the compositions may also be used, and may be desirable for some applications.

The ingredients for compositions described herein including fluorinated polymers, solvents, and optionally water can be combined using techniques known in the art for combining these types of materials, including using conventional magnetic stir bars or mechanical mixer (e.g., in-line static mixer and recirculating pump).

In some embodiments of treatment methods according to the present disclosure, the hydrocarbon-bearing formation has brine. The brine present in the formation may be from a variety of sources including at least one of connate water, flowing water, mobile water, immobile water, residual water from a fracturing operation or from other downhole fluids, or crossflow water (e.g., water from adjacent perforated formations or adjacent layers in the formation). In some embodiments, the brine is connate water. In some embodiments, the brine causes water blocking (i.e., declining productivity resulting from increasing water saturation in a well). In some embodiments, useful solvents at least one of at least partially solubilize or at least partially displace brine in the hydrocarbon-bearing formation. By the term "solubilizes" the brine, it is meant that the solvent dissolves all or nearly all (e.g., at least 95% including up to 100%) of the water and the salts in the brine. Without wishing to be bound by theory, it is believed that the effectiveness of the treatment methods disclosed herein for improving hydrocarbon productivity of a particular oil and/or gas well having brine accumulated in the near wellbore region will typically be determined by the ability of the composition to dissolve or displace the quantity of brine present in the near wellbore region of the well. Hence, at a given temperature greater amounts of compositions having lower brine solubility (i.e., compositions that can dissolve a relatively lower amount of brine) will typically be needed than in the case of compositions having higher brine solubility and containing the same fluorinated polymer at the same concentration.

In some embodiments of treatment methods according to the present disclosure, combining the composition and the brine of the hydrocarbon-bearing formation at the temperature of the hydrocarbon-bearing formation does not cause the phase separation of the fluorinated polymer. The phase behavior is typically evaluated prior to contacting the hydrocarbon-bearing formation with the composition by obtaining a sample of the brine from the hydrocarbon-bearing formation and/or analyzing the composition of the brine from the hydrocarbon-bearing formation. If a sample of the brine from the hydrocarbon-bearing formation is analyzed, a model brine having the same or similar composition to the composition of the brine in the formation can be prepared. The brine (or the model brine) and the composition (i.e., the fluorinated polymer-solvent composition) are combined (e.g., in a container) at the temperature and then mixed together (e.g., by shaking or stirring). The mixture is then maintained at the temperature for 15 minutes, removed from the heat, and immediately visually evaluated to see if it phase separates or if precipitation occurs. In some embodiments, the brine has at least 2, 3, 4, 5, 6, 7, 8, 9, or even at least 10 weight percent dissolved salts, based on the total weight of the brine. In some embodiments, the amount of brine that is added before phase separation occurs is at least 5, 10, 15, 20, 25, 30, 35, 40, 45, or even at least 50% by weight, based on the total weight of brine and fluorinated polymer-solvent composition combined in the phase behavior evaluation.

Although not wishing to be bound by theory, it is believed that methods according to the present disclosure will provide more desirable results when the composition is homogenous and free of precipitate at the temperature(s) encountered in the hydrocarbon-bearing formation. Accordingly, the phase behavior of the composition and the brine can be evaluated over an extended period of time (e.g., 1 hour, 12 hours, 24 hours or longer) to determine if any phase separation or cloudiness is observed. By adjusting the relative amounts of brine (e.g., model brine) and the fluorinated polymer-solvent composition, it is possible to determine the maximum brine uptake capacity (above which phase separation occurs) of the fluorinated polymer-solvent composition at a given temperature. Varying the temperature at which the above procedure is carried out typically results in a more complete understanding of the suitability of fluorinated polymer-solvent compositions as treatment compositions for a given well.

In some embodiments of the treatment methods disclosed herein, when the composition is contacting the hydrocarbon-bearing formation, the fluorinated polymer has a cloud point that is above the temperature of the hydrocarbon-bearing formation. Although not wishing to be bound by theory, it is believed that once the composition contacts a hydrocarbon-bearing formation (e.g., downhole), the environment will cause the fluorinated anionic surfactant to become less soluble in the composition and adsorb onto the formation. The term "cloud point" refers to the temperature at which the fluorinated polymer becomes non-homogeneous in the composition. This temperature can depend on many variables (e.g., concentration of the fluorinated polymer, solvent composition, brine concentration and composition, hydrocarbon concentration and composition, and the presence of other components (e.g., surfactants)).

In some embodiments of the treatment methods disclosed herein, when the composition is contacting the hydrocarbon-bearing formation, the hydrocarbon-bearing formation is substantially free of precipitated salt. As used herein, the term "substantially free of precipitated salt" refers to an amount of salt that does not interfere with the ability of the composition (or the fluorinated polymer) to increase the gas permeability of the hydrocarbon-bearing formation. In some embodiments, "substantially free of precipitated salt" means that no precipitate is visually observed. In some embodiments, "substantially free of precipitated salt" is an amount of salt that is less than 5% by weight higher than the solubility product at a given temperature and pressure.

In some embodiments of the treatment methods disclosed herein, the hydrocarbon-bearing formation has both liquid hydrocarbons and gas, and the hydrocarbon-bearing formation has at least a gas permeability that is increased after the hydrocarbon-bearing formation is contacted with the composition. In some embodiments, the gas permeability after contacting the hydrocarbon-bearing formation with the composition is increased by at least 5 percent (in some embodiments, by at least 10, 15, 20, 30, 40, 50, 60, 70, 80, 90, or even 100 percent or more) relative to the gas permeability of the formation before contacting the formation with the composition. In some embodiments, the gas permeability is a gas relative permeability. In some embodiments, the liquid (e.g., oil or condensate) permeability in the hydrocarbon-bearing formation is also increased (in some embodiments, by at least 5, 10, 15, 20, 30, 40, 50, 60, 70, 80, 90, or even 100 percent or more) after contacting the formation with the composition. In some embodiments, useful compositions (and useful solvents) at least partially solubilize or at least partially displace liquid hydrocarbons in the hydrocarbon-bearing formation.

The hydrocarbon-bearing formations having both gas and liquid hydrocarbons may have gas condensate, black oil, or volatile oil and may comprise, for example, at least one of methane, ethane, propane, butane, pentane, hexane, heptane, octane, nonane, decane, or higher hydrocarbons. The term "black oil" refers to the class of crude oil typically having gas-oil ratios (GOR) less than about 2000 scf/stb (356 $m^3/m^3$). For example, a black oil may have a GOR in a range from about 100 (18), 200 (36), 300 (53), 400 (71), or even 500 scf/stb (89 $m^3/m^3$) up to about 1800 (320), 1900 (338), or even 2000 scf/stb (356 $m^3/m^3$). The term "volatile oil" refers to the class of crude oil typically having a GOR in a range between about 2000 and 3300 scf/stb (356 and 588 $m^3/m^3$). For example, a volatile oil may have a GOR in a range from about 2000 (356), 2100 (374), or even 2200 scf/stb (392 $m^3/m^3$) up to about 3100 (552), 3200 (570), or even 3300 scf/stb (588 $m^3/m^3$).

Generally, for the treatment methods disclosed herein, the amounts of the fluorinated polymer and solvent (and type of solvent) is dependent on the particular application since conditions typically vary between wells, at different depths of individual wells, and even over time at a given location in an individual well. Advantageously, treatment methods according to the present disclosure can be customized for individual wells and conditions.

Methods of making a composition according to the present disclosure include receiving (e.g., obtaining or measuring) data comprising the temperature and at least one of the hydrocarbon composition or the brine composition (including the brine saturation level and components of the brine) of a selected geological zone of a hydrocarbon-bearing formation. These data can be obtained or measured using techniques well known to one of skill in the art. The methods of making a composition disclosed herein also include generating a formulation based at least in part on compatibility information concerning the fluorinated polymer, the solvent, the temperature, and at least one of the hydrocarbon composition or brine composition of the selected geological zone of the formation. In some embodiments, the compatibility information comprises information concerning phase stability of a mixture of the fluorinated polymer, the solvent, and a model brine composition, wherein the model brine composition is based at least partially on the brine composition of the geological zone of the formation. The phase stability of a solution or dispersion can be evaluated using the phase behavior evaluation described above. The phase behavior of the composition and the brine can be evaluated over an extended period of time (e.g., 1 hour, 12 hours, 24 hours or longer) to determine if any phase separation or cloudiness is observed.

In some embodiments, the compatibility information comprises information concerning solid (e.g., salts or asphaltenes) precipitation from a mixture of the fluorinated polymer, the solvent, a model brine composition, and a model hydrocarbon composition, wherein the model brine composition is based at least partially on the brine composition of the geological zone of the formation, and wherein the model hydrocarbon composition is based at least partially on the hydrocarbon composition of the geological zone of the formation.

In additional to using a phase behavior evaluation, it is also contemplated that one may be able obtain the compatibility information, in whole or in part, by computer simulation or by referring to previously determined, collected, and/or tabulated information (e.g., in a handbook or a computer database).

Exemplary hydrocarbon-bearing formations that may be treated according to the present disclosure include siliciclastic (e.g., shale, conglomerate, diatomite, sand, and sandstone) or carbonate (e.g., limestone) formations. Typically, methods according to the present disclosure can be used to treat siliciclastic formations (including methods that use anionic polymers). In some embodiments, the hydrocarbon-bearing formation is predominantly sandstone (i.e., at least 50 percent by weight sandstone). Methods according to the present disclosure can also be used to treat carbonate formations, for example, when the formation is a fractured formation comprising a plurality of proppants in the fracture.

Methods according to the present disclosure may be practiced, for example, in a laboratory environment (e.g., on a core sample (i.e., a portion) of a hydrocarbon-bearing formation) or in the field (e.g., on a subterranean hydrocarbon-bearing formation situated downhole). Typically, the methods disclosed herein are applicable to downhole conditions having a pressure in a range from about 1 bar (100 kPa) to about 1000 bars (100 MPa) and have a temperature in a range from about 100° F. (37.8° C.) to 400° F. (204° C.) although the methods are not limited to hydrocarbon-bearing formations having these conditions. Those skilled in the art, after reviewing the instant disclosure, will recognize that various factors may be taken into account in practice of the any of the disclosed methods including, for example, the ionic strength of the brine, pH (e.g., a range from a pH of about 4 to about 10), and the radial stress at the wellbore (e.g., about 1 bar (100 kPa) to about 1000 bars (100 MPa)).

In the field, contacting a hydrocarbon-bearing formation with a composition described herein can be carried out using methods (e.g., by pumping under pressure) well known to those skilled in the oil and gas art. Coil tubing, for example, may be used to deliver the treatment composition to a particular geological zone of a hydrocarbon-bearing formation. In some embodiments of practicing the methods described herein it may be desirable to isolate a geological zone (e.g., with conventional packers) to be contacted with the composition.

Methods of using compositions described herein are useful, for example on both existing and new wells. Typically, it is believed to be desirable to allow for a shut-in time after compositions described herein are contacted with the hydrocarbon-bearing formations. Exemplary set in times include a few hours (e.g., 1 to 12 hours), about 24 hours, or even a few (e.g., 2 to 10) days. After the composition has been allowed to remain in place for a selected time, the solvents present in the composition may be recovered from the formation by simply pumping fluids up tubing in a well as is commonly done to produce fluids from a formation.

In some embodiments of treatment methods according to the present disclosure, the method comprises contacting the hydrocarbon-bearing formation with a fluid prior to contacting the hydrocarbon-bearing formation with the composition, wherein the fluid at least one of partially solubilizes or partially displaces the brine in the hydrocarbon-bearing formation. In some embodiments, the fluid partially solubilizes the brine. In some embodiments, the fluid partially displaces the brine. In some embodiments, the fluid is substantially free of fluorinated polymers. The term "substantially free of fluorinated polymers" refers to fluid that may have a fluorinated polymer in an amount insufficient for the fluid to have a cloud point (e.g., when it is below its critical micelle concentration). A fluid that is substantially free of fluorinated polymers may be a fluid that has a fluorinated polymer but in an amount insufficient to alter the wettability of, for example, a hydrocarbon-bearing formation under downhole conditions. A fluid that is substantially free of fluorinated polymers includes those that have a weight percent of such polymers as low as 0 weight percent. The fluid may be useful for decreasing the concentration of at least one of the salts present in the brine prior to introducing the composition to the hydrocarbon-bearing formation. The change in brine composition may change the results of a phase behavior evaluation (e.g., the combination of a composition with a first brine prior to the fluid preflush may result in phase separation while the combination of the composition with the brine after the fluid preflush may result in one liquid phase.)

In some embodiments of treatment methods disclosed herein, the fluid comprises at least one of toluene, diesel, heptane, octane, or condensate. In some embodiments, the fluid comprises at least one of water, methanol, ethanol, or isopropanol. In some embodiments, the fluid comprises at least one of a polyol or polyol ether independently having from 2 to 25 carbon atoms. In some embodiments, useful polyols have 2 to 20, 2 to 15, 2 to 10, 2 to 8, or even 2 to 6 carbon atoms. Exemplary useful polyols include ethylene glycol, propylene glycol, polypropylene glycol), 1,3-propanediol, trimethylolpropane, glycerol, pentaerythritol, and 1,8-octanediol. In some embodiments, useful polyol ethers may have from 3 to 25 carbon atoms, 3 to 20, 3 to 15, 3 to 10, 3 to 8, or even from 5 to 8 carbon atoms. Exemplary useful polyol ethers include diethylene glycol monomethyl ether, ethylene glycol monobutyl ether, dipropylene glycol monomethyl ether, 2-butoxyethanol, and 1-methoxy-2-propanol. In some embodiments, the fluid comprises at least one monohydroxy alcohol, ether, or ketone independently having up to four carbon atoms. In some embodiments, the fluid comprises at least one of nitrogen, carbon dioxide, or methane.

In some embodiments, the fluid at least one of partially solubilizes or displaces the liquid hydrocarbons in the hydrocarbon-bearing formation.

In some embodiments of the treatment methods disclosed herein, the hydrocarbon-bearing formation has at least one fracture. In some embodiments, fractured formations have at least 2, 3, 4, 5, 6, 7, 8, 9, or even 10 or more fractures. As used herein, the term "fracture" refers to a fracture that is man-made. In the field, for example, fractures are typically made by injecting a fracturing fluid into a subterranean geological formation at a rate and pressure sufficient to open a fracture therein (i.e., exceeding the rock strength).

In some embodiments of the treatment methods disclosed herein, wherein contacting the formation with the composition provides an increase in at least one of the gas permeability or the liquid permeability of the formation, the formation is a non-fractured formation (i.e., free of man-made fractures). Advantageously, treatment methods disclosed herein typically provide an increase in at least one of the gas permeability or the liquid permeability of the formation without fracturing the formation.

In some embodiments of the treatment methods disclosed herein, wherein the hydrocarbon-bearing formation has at least one fracture, the fracture has a plurality of proppants therein. Prior to delivering the proppants into a fracture, the proppants may be treated with a fluorinated polymer or may be untreated (e.g., may comprise less than 0.1% by weight fluorinated polymer, based on the total weight of the plurality of proppants). Exemplary proppants known in the art include those made of sand (e.g., Ottawa, Brady or Colorado Sands, often referred to as white and brown sands having various ratios), resin-coated sand, sintered bauxite, ceramics (i.e., glasses, crystalline ceramics, glass-ceramics, and combinations thereof), thermoplastics, organic materials (e.g., ground or crushed nut shells, seed shells, fruit pits, and processed wood), and clay. Sand proppants are available, for example, from Badger Mining Corp., Berlin, Wis.; Borden Chemical, Columbus, Ohio; and Fairmont Minerals, Chardon, Ohio. Thermoplastic proppants are available, for example, from the Dow Chemical Company, Midland, Mich.; and BJ Services, Houston, Tex. Clay-based proppants are available, for example, from CarboCeramics, Irving, Tex.; and Saint-Gobain, Courbevoie, France. Sintered bauxite ceramic proppants are available, for example, from Borovichi Refractories, Borovichi, Russia; 3M Company, St. Paul, Minn.; CarboCeramics; and Saint Gobain. Glass bubble and bead proppants are available, for example, from Diversified Industries, Sidney, British Columbia, Canada; and 3M Company.

In some embodiments of methods of treating fractured formations, the proppants form packs within a formation and/or wellbore. Proppants may be selected to be chemically compatible with the solvents and compositions described herein. The term "proppant" as used herein includes fracture proppant materials introducible into the formation as part of a hydraulic fracture treatment and sand control particulate introducible into the wellbore/formation as part of a sand control treatment such as a gravel pack or frac pack.

In some embodiments, methods according to the present disclosure include contacting the hydrocarbon-bearing formation with the composition at least one of during fracturing or after fracturing the hydrocarbon-bearing formation.

In some embodiments of methods of treating fractured formations, the amount of the composition introduced into the fractured formation is based at least partially on the volume of the fracture(s). The volume of a fracture can be measured using methods that are known in the art (e.g., by pressure transient testing of a fractured well). Typically, when a fracture is created in a hydrocarbon-bearing subterranean formation, the volume of the fracture can be estimated using at least one of the known volume of fracturing fluid or the known amount of proppant used during the fracturing operation. Coil tubing, for example, may be used to deliver the treatment composition to a particular fracture. In some embodiments, in practicing the methods disclosed herein it may be desirable to isolate the fracture (e.g., with conventional packers) to be contacted with the treatment composition.

In some embodiments, wherein the formation treated according to the methods described herein has at least one fracture, the fracture has a conductivity, and after the composition contacts at least one of the fracture or at least a portion of the plurality of proppants, the conductivity of the fracture is increased (e.g., by 25, 50, 75, 100, 125, 150, 175, 200, 225, 250, 275, or even by 300 percent).

Referring to FIG. 1, an exemplary offshore oil platform is schematically illustrated and generally designated 10. Semi-submersible platform 12 is centered over submerged hydrocarbon-bearing formation 14 located below sea floor 16. Subsea conduit 18 extends from deck 20 of platform 12 to wellhead installation 22 including blowout preventers 24. Platform 12 is shown with hoisting apparatus 26 and derrick 28 for raising and lowering pipe strings such as work string 30.

Wellbore 32 extends through the various earth strata including hydrocarbon-bearing formation 14. Casing 34 is cemented within wellbore 32 by cement 36. Work string 30 may include various tools including, for example, sand control screen assembly 38 which is positioned within wellbore 32 adjacent to hydrocarbon-bearing formation 14. Also extending from platform 12 through wellbore 32 is fluid delivery tube 40 having fluid or gas discharge section 42 positioned adjacent to hydrocarbon-bearing formation 14, shown with production zone 48 between packers 44, 46. When it is desired to treat the near-wellbore region of hydrocarbon-bearing formation 14 adjacent to production zone 48, work string 30 and fluid delivery tube 40 are lowered through casing 34 until sand control screen assembly 38 and fluid discharge section 42 are positioned adjacent to the near-wellbore region of hydrocarbon-bearing formation 14 including perforations 50. Thereafter, a composition described herein is pumped down delivery tube 40 to progressively treat the near-wellbore region of hydrocarbon-bearing formation 14.

While the drawing depicts an offshore operation, the skilled artisan will recognize that the methods for treating a production zone of a wellbore are equally well-suited for use in onshore operations. Also, while the drawing depicts a vertical well, the skilled artisan will also recognize that methods according to the present disclosure are equally well-suited for use in deviated wells, inclined wells or horizontal wells.

Advantages and embodiments of the methods disclosed herein are further illustrated by the following examples, but the particular materials and amounts thereof recited in these examples, as well as other conditions and details, should not be construed to unduly limit this invention. Unless otherwise noted, all parts, percentages, ratios, etc. in the examples and the rest of the specification are by weight. In the Tables, "nd" means not determined.

EXAMPLES

Fluorinated Polymers

Fluorinated polymer 1 was a nonionic fluorinated polymer obtained from Omnova Solutions Inc., Fairlawn, Ohio, under the trade designation "POLYFOX PF-159".

Fluorinated polymer 2 was an anionic fluorinated polymer obtained from Omnova Solutions Inc. under the trade designation "POLYFOX PF-156A".

Fluorinated polymer 3 was an anionic fluorinated polymer obtained from Omnova Solutions Inc. under the trade designation "POLYFOX PF-136A".

Comparative fluorinated polymer A was a cationic water-dilutable fluoropolymer for porous surface treatments obtained from E. I. du Pont de Nemours and Co., Wilmington, Del., under the trade designation "ZONYL 8740".

Comparative fluorinated material B was a nonionic fluorinated surfactant represented by formula $CF_3CF_2(CF_2CF_2)_{2-4}CH_2CH_2O(CH_2CH_2O)_xH$ obtained from E. I. du Pont de Nemours and Co., under the trade designation "ZONYL FSO".

Brines

Water (92.25%) 5.9% sodium chloride, 1.6% calcium chloride, 0.23% magnesium chloride hexahydrate, and 0.05% potassium chloride were combined to provide Brine 1.

Water (97%) and 3% potassium chloride were combined to provide Brine 2.

Compatibility Evaluations

A fluorinated polymer (0.06 gram (g)) and solvents (Solvent A and Solvent B) were added to a vial to prepare a sample (3 g total amount, 2% w/w of fluorinated polymer). Brine was added to the vial, and the vial was placed in a heated bath at 135° C. for 15 minutes. The vial was removed from the bath, and then visually inspected immediately to determine whether the sample was one phase.

The fluorinated polymer, solvents, and brine used for each Compatibility Evaluation are shown in Table 1 (below).

TABLE 1

| Fluorinated Polymer | Solvent A (weight %) | Solvent B (weight %) | Brine (amount) | Result |
|---|---|---|---|---|
| 1 | Propylene glycol (PG) (69) | Isopropanol (IPA) (29) | 1 (1 gram) | One phase |
| 2 | PG (69) | IPA (29) | 1 (1 gram) | Slightly hazy, one phase |
| 3 | PG (69) | IPA (29) | 2 (0.75 gram) | One phase |
| A | PG (69) | IPA (29) | 1 (1 gram) | One phase |
| 1 | Methanol (98) | Not used | 1 (1 gram) | Two phases |
| 2 | Methanol (98) | Not used | 1 (1 gram) | Two phases, Precipitation |
| 3 | Methanol (98) | Not used | 1 (1 gram) | Two phases, Precipitation |
| B | Methanol (98) | Not used | 1 (1 gram) | One phase |

Examples 1 to 3 and Comparative Examples A, B, and C

Composition Preparation

A fluorinated polymer and two solvents (Solvent A and Solvent B) were combined to make 600 grams of a 2% by weight solution of the fluorinated polymer. The components were mixed together using a magnetic stirrer and magnetic stir bar. The fluorinated polymers, solvents, and amounts (in wt. % based on the total weight of the composition used for Examples 1 to 3 and Comparative Examples A to C are shown in Table 2, below.

TABLE 2

| Example | Fluorinated Polymer | Solvent A | Solvent B |
|---|---|---|---|
| 1 | 1 (2) | PG (69) | IPA (29) |
| 2 | 2 (2) | PG (69) | IPA (29) |
| 3 | 3 (2) | PG (69) | IPA (29) |
| Comp. Ex. A | A (2) | PG (69) | IPA (29) |
| Comp. Ex. B | B (2) | PG (69) | IPA (29) |
| Comp. Ex. C | none | PG (70) | IPA (30) |

Figure 2:
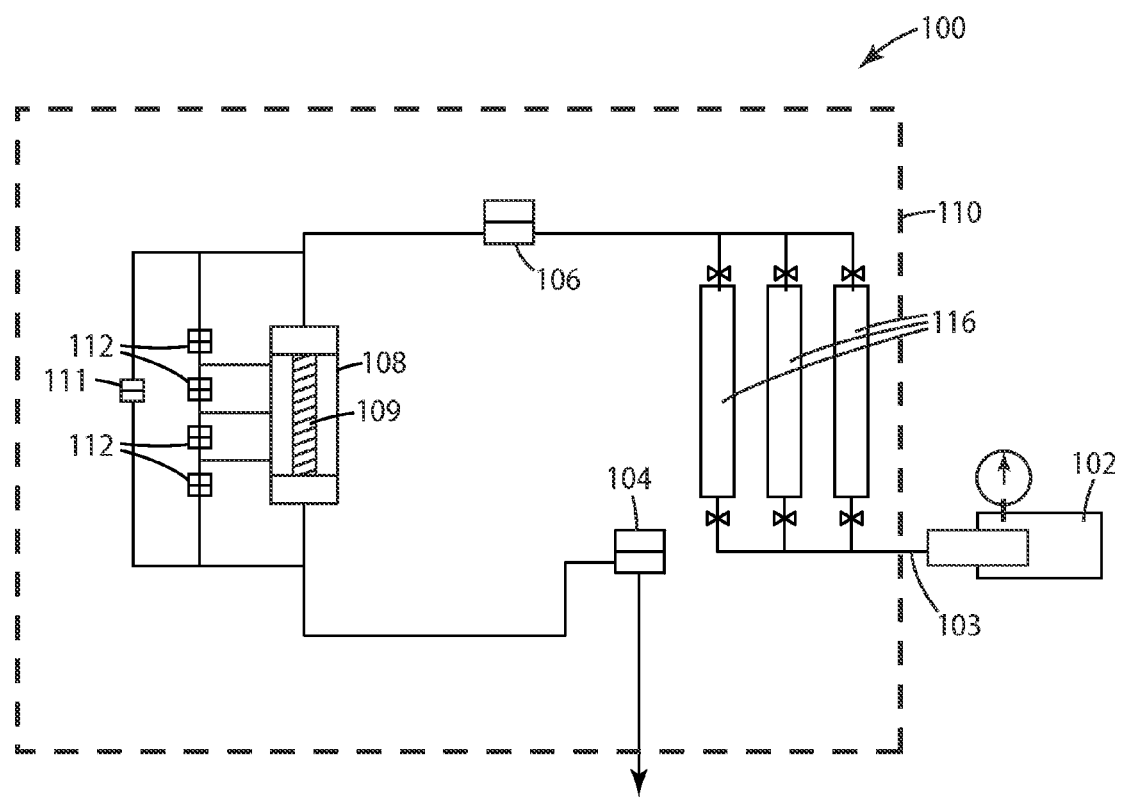
FIG. 2 is a schematic illustration of the core flood set-up used for the Examples.

Core Flood Setup:

A schematic diagram of a core flood apparatus 100 used to determine relative permeability of a substrate sample (i.e., core) is shown in FIG. 2. Core flood apparatus 100 included positive displacement pumps (Model No. 1458; obtained from General Electric Sensing, Billerica, Mass.) 102 to inject fluid 103 at constant rate into fluid accumulators 116. Multiple pressure ports 112 on high-pressure core holder 108 (Hassler-type Model UTPT-1x8-3K-13 obtained from Phoenix, Houston Tex.) were used to measure pressure drop across four sections (2 inches in length each) of core 109. An additional pressure port 111 on core holder 108 was used to measure pressure drop across the entire length (8 inches) of core 109. Two back-pressure regulators (Model No. BPR-50; obtained from Temco, Tulsa, Okla.) 104, 106 were used to control the flowing pressure upstream 106 and downstream 104 of core 109.

The flow of fluid was through a vertical core to avoid gravity segregation of the gas. High-pressure core holder 108, back pressure regulators 106, fluid accumulators 116, and tubing were placed inside a pressure- and temperature-controlled oven 110 (Model DC 1406F; maximum temperature rating of 650° F. (343° C.) obtained from SPX Corporation, Williamsport, Pa.) at 275° F. (135° C.). The maximum flow rate of fluid was 7,000 mL/hr.

Cores:

A core sample was cut from a Berea sandstone block. One core was used for each of Examples 1 to 3 and for each of Comparative Examples A to C. The properties for each of the cores used are shown in Table 3, below.

TABLE 3

|  | Ex. 1 | Ex. 2 | Ex. 3 | C.E. A | C.E. B | C.E. C |
|---|---|---|---|---|---|---|
| Diameter, cm | 2.5 | 2.6 | 2.5 | 2.5 | 2.5 | 2.6 |
| Length, cm | 14.6 | 14.6 | 14.6 | 14.6 | 14.6 | 14.6 |
| Pore volume, mL | 13.5 | 14.7 | 13.5 | 13.4 | 13.4 | 15.2 |
| Porosity, % | 19 | 19.4 | 19 | 19 | 19.0 | 19.4 |

The porosity was measured using a gas expansion method. The pore volume is the product of the bulk volume and the porosity.

Synthetic Condensate Composition:

A synthetic gas-condensate fluid containing 93 mole percent methane, 4 mole percent n-butane, 2 mole percent n-decane, and 1 mole percent n-pentadecane was used for the core flooding evaluation. Approximate values for various properties of the fluid are reported Table 4, below.

TABLE 4

| Dewpoint, psig (Pa) | 4200 (2.9 × $10^7$) |
|---|---|
| Core pressure, psig (Pa) | 1500 (1.0 × $10^7$) |
| Liquid dropout, V/Vt % | 3.2 |
| Gas viscosity, cP | 0.017 |
| Oil viscosity, cP | 0.22 |
| Interfacial tension, dynes/cm | 5.0 |

Core Flood Procedure:

The cores described in Table 3 were dried for 72 hours in a standard laboratory oven at 95° C., and then were wrapped in aluminum foil and heat shrink tubing (obtained under the trade designation "TEFLON HEAT SHRINK TUBING" from Zeus, Inc., Orangeburg, S.C.). Referring again to FIG. 2, the wrapped core 109 was placed in core holder 108 inside oven 110 at 75° F. (24° C.). An overburden pressure of 3400 psig (2.3×$10^7$ Pa) was applied. The initial single-phase gas permeability was measured using nitrogen at a flowing pressure of 1200 psig (8.3×$10^6$ Pa).

The brine (Brine 1 or Brine 2) was introduced into the core 109 by the following procedure. The outlet end of the core holder was connected to a vacuum pump and a full vacuum was applied for 30 minutes with the inlet closed. The inlet was connected to a burette with the brine in it. The outlet was closed and the inlet was opened to allow a known volume of brine to flow into the core. For example, a 26% brine saturation (i.e., 26% of the pore volume of the core was saturated with brine) was established by allowing 5.3 mL of brine to flow into the core before the inlet value was closed. The permeability was measured at the water saturation by flowing nitrogen at 1200 psig and 75° F. (24° C.).

Referring again to FIG. 2, the wrapped core 109 in the core holder 108 was placed inside oven 110 at 275° F. (135° C.) for several hours to allow it to reach reservoir temperature. The synthetic gas-condensate fluid described above was then introduced at a flow rate of about 690 mL/hr until steady state was established. Upstream back-pressure regulator 106 was set at about 4900 psig (3.38×$10^7$ Pa), above the dew point pressure of the fluid, and downstream back-pressure regulator 104 was set at about 1500 psig (3.38×$10^7$ Pa). The gas relative permeability before treatment was then calculated from the steady state pressure drop. The fluorinated composition was then injected into the core. After at least 20 pore volumes were injected, the fluorinated composition was held in the core at 275° F. (135° C.) for about 15 hours. The synthetic gas condensate fluid described above was then introduced again at a flow rate of about 690 mL/hour using positive displacement pump 102 until a steady state was reached (about 150 to 200 pore volumes). The gas relative permeability after treatment was then calculated from the steady state pressure drop. For Examples 1, the core was allowed to stand in the presence of the synthetic condensate for 3 days, and a second core flood was run. For Example 3 and Comparative Example C, the core was allowed to stand in the presence of the synthetic condensate compositions for about 24 hours before a second core flood was run. For Example 2, the core was allowed to stand in the presence of the synthetic condensate compositions for about 3 hours before a second core flood was run and then allowed to stand in the presence of condensate for about 3 days total before a third core flood was run.

Following the relative permeability measurements, methane gas was injected, using positive displacement pump 102, to displace the condensate and measure the final single-phase gas permeability.

For Examples 1 to 3 and Comparative Examples A to C, the initial single-phase gas permeability, measured after brine saturation, the brine and brine saturation, the gas relative permeability before treatment with the fluorinated composition, the gas relative permeability after treatment (at the times described above), and the ratio of the gas relative permeabilities after and before treatment (i.e., improvement factor) are reported in Table 5, below.

TABLE 5

|  | 1 | 2 | 3 | C.E. A | C.E. B | C.E. C |
|---|---|---|---|---|---|---|
| Gas permeability, millidarcy (md) | 134.4 | 296.7 | 137.3 |  | 132.2 | 357.5 |
| Brine (saturation) | 1 (26%) | 1 (26%) | 2 (20%) | 1 (26%) | 1 (26%) | 1 (26%) |
| Gas relative permeability before treatment | 0.061 | 0.062 | 0.068 | 0.068 | 0.064 | 0.069 |

TABLE 5-continued

|  | 1 | 2 | 3 | C.E. A | C.E. B | C.E. C |
|---|---|---|---|---|---|---|
| Gas relative permeability after treatment | 0.122/0.100 | 0.127/0.102/ 0.085 | 0.142/0.112 | plugged | 1.04 | 0.115/0.099 |
| Improvement factor | 1.96/1.61 | 2.05/1.65/ 1.37 | 2.09/1.65 |  | 1.63 | 1.67/1.43 |

Various modifications and alterations of this disclosure may be made by those skilled the art without departing from the scope and spirit of the disclosure, and it should be understood that this invention is not to be unduly limited to the illustrative embodiments set forth herein.

What is claimed is:

1. A method of treating a hydrocarbon-bearing formation, the method comprising:
   contacting the hydrocarbon-bearing formation with a composition comprising solvent and a fluorinated polymer, wherein the fluorinated polymer comprises units having formula:

$$\begin{array}{c} O{-}(CH_2)_n{-}Rf; \text{ and} \\ (CH_2)_m \\ {-}\!\!\!\left[\!\!\begin{array}{c} O \\ | \\ R \end{array}\!\!\right]\!\!\!{-} \end{array}$$

at least one hydrophilic group,
   wherein
   each Rf independently represents a fluoroalkyl group having from 1 to 4 carbon atoms;
   each R is independently hydrogen, alkyl having 1 to 6 carbon atoms, or $-(CH_2)_m-O-(CH_2)_n-Rf$;
   each m is independently 1, 2, or 3; and
   each n is independently 0, 1, 2, or 3,
   wherein the hydrocarbon-bearing formation is at least one of a siliciclastic formation or fractured formation comprising a plurality of proppants in a fracture.

2. The method according to claim 1, wherein the fluorinated polymer comprises a plurality of alkyleneoxy groups having from 2 to 4 carbon atoms.

3. The method according to claim 2, wherein at least a portion of the plurality of alkyleneoxy groups are present in segments represented by formula:

$-[EO]_p[HAO]_q[EO]_p-$; or $-[HAO]_q[EO]_p-[HAO]_q$, wherein
   EO represents $-CH_2CH_2O-$;
   each HAO independently represents $-CH(CH_3)CH_2O-$, $-CH_2CH(CH_3)O-$, $-CH(CH_2CH_3)CH_2O-$, $-CH_2CH(CH_2CH_3)O-$, or $-CH_2C(CH_3)_2O-$;
   each p is independently an integer of from 1 to about 250; and
   each q is independently an integer of from 0 to about 55.

4. The method according to claim 1, wherein the fluorinated polymer comprises at least one of $-P(O)(OY)_2$, $-O-P(O)(OY)_2$, $(-O)_2-P(O)(OY)$, $-SO_3Y$, $-O-SO_3Y$, or $-CO_2Y$, and wherein Y is hydrogen or a counter cation.

5. The method according to claim 1, wherein the fluorinated polymer is represented by formula:

$$YO{-}\!\!\overset{O}{\underset{O}{S}}\!\!{-}O{-}\!\!\left[\!\!\begin{array}{c} (CH_2)_m \\ O{-}(CH_2)_n\text{-}Rf \\ | \\ R \end{array}\!\!\right]_{b'}\!\!\!{-}X{-}\!\!\left[\!\!\begin{array}{c} (CH_2)_m \\ O{-}(CH_2)_n\text{-}Rf \\ | \\ R \end{array}\!\!\right]_b\!\!\!{-}O{-}\!\!\overset{O}{\underset{O}{S}}\!\!{-}OY;\text{ or}$$

$$YO{-}\!\!\overset{O}{\underset{O}{S}}\!\!{-}O{-}\!\!\left[\!\!\begin{array}{c} (CH_2)_m \\ O{-}(CH_2)_n{-}Rf \\ | \\ R \end{array}\!\!\right]_a\!\!\!{-}O{-}\!\!\overset{O}{\underset{O}{S}}\!\!{-}OY,$$

wherein
   a has a value from 2 to about 10;
   b and b' each independently have a value from 0 to 5, with the proviso that b+b' is at least 2;
   X is alkylene that is optionally interrupted by $-O-$ or $-S-$; and
   each Y is independently hydrogen or a counter cation.

6. The method according to claim 1, wherein the fluorinated polymer is represented by formula:

$$H{-}\!\!\left[\!\!\begin{array}{c} (CH_2)_m \\ O{-}(CH_2)_n{-}Rf \\ | \\ R \end{array}\!\!\right]_{c'}\!\!\!{-}O{-}[CH_2CH_2{-}O]_d{-}\!\!\left[\!\!\begin{array}{c} (CH_2)_m \\ O{-}(CH_2)_n{-}Rf; \\ | \\ R \end{array}\!\!\right]_c\!\!\!{-}O{-}H$$

wherein
   c and c' each independently have a value from 0 to 5, with the proviso that c+c' is at least 2;
   d is an integer from about 5 to about 50.

7. The method according to claim 1, wherein each Rf is independently fluoroalkyl having up to 2 carbon atoms.

8. The method according to claim 1, wherein the solvent comprises at least one of a polyol or polyol ether independently having from 2 to 25 carbon atoms.

9. The method according to claim 1, wherein the solvent comprises at least one of water, a monohydroxy alcohol, an ether, or a ketone, each independently having up to 4 carbon atoms.

10. The method according to claim 1, wherein the hydrocarbon-bearing formation has brine.

11. The method according to claim 10, wherein the solvent at least one of at least partially solubilizes or at least partially displaces the brine in the hydrocarbon-bearing formation.

12. The method according to claim 10, the method further comprising contacting the hydrocarbon-bearing formation with a fluid prior to contacting the hydrocarbon-bearing formation with the composition, wherein the fluid is substantially free of fluorinated polymers, and wherein the fluid at least one of partially solubilizes or partially displaces the brine in the hydrocarbon-bearing formation.

13. The method according to claim 1, wherein the hydrocarbon-bearing formation is penetrated by a wellbore, and wherein a region near the wellbore is contacted with the composition.

14. The method according to claim 13, further comprising obtaining hydrocarbons from the wellbore after contacting the hydrocarbon-bearing formation with the composition.

15. The method according to claim 1, wherein the hydrocarbon-bearing formation has at least one fracture, and wherein the fracture has a plurality of proppants therein.

16. The method according to claim 1, wherein the hydrocarbon-bearing formation is predominantly sandstone.

17. The method according to claim 1, wherein the hydrocarbon-bearing formation has both liquid hydrocarbons and gas, and wherein the hydrocarbon-bearing formation has at least a gas permeability that is increased after the hydrocarbon-bearing formation is contacted with the composition.

18. The method according to claim 17, wherein the solvent at least one of at least partially solubilizes or at least partially displaces the liquid hydrocarbons in the hydrocarbon-bearing formation.

19. A hydrocarbon-bearing formation treated according to the method of claim 1.

* * * * *